United States Patent
Baum et al.

(10) Patent No.: US 8,259,873 B2
(45) Date of Patent: Sep. 4, 2012

(54) METHOD AND APPARATUS FOR CORRELATING TWO DATA SECTIONS

(75) Inventors: Peter Georg Baum, Hannover (DE); Walter Voessing, Hannover (DE); Michael Arnold, Isernhagen (DE)

(73) Assignee: Thomson Licensing, Boulogne-Billancourt (FR)

( * ) Notice: Subject to any disclaimer, the term of this patent is extended or adjusted under 35 U.S.C. 154(b) by 868 days.

(21) Appl. No.: 12/225,397

(22) PCT Filed: Mar. 8, 2007

(86) PCT No.: PCT/EP2007/052179
§ 371 (c)(1),
(2), (4) Date: Sep. 19, 2008

(87) PCT Pub. No.: WO2007/107455
PCT Pub. Date: Sep. 27, 2007

(65) Prior Publication Data
US 2010/0166120 A1    Jul. 1, 2010

(30) Foreign Application Priority Data
Mar. 22, 2006  (EP) .................................... 06090037

(51) Int. Cl.
*H03D 1/00* (2006.01)
*H04L 27/06* (2006.01)
(52) U.S. Cl. ...................................................... 375/343
(58) Field of Classification Search .................. 375/146, 375/150, 224, 260, 340, 343, 350, 355; 382/100, 382/115, 203, 280
See application file for complete search history.

(56) References Cited

U.S. PATENT DOCUMENTS

| 5,029,184 | A | * | 7/1991 | Andren et al. | 375/138 |
| 6,526,385 | B1 | | 2/2003 | Kobayashi et al. | |
| 7,194,055 | B2 | * | 3/2007 | Tandai et al. | 375/368 |
| 2002/0164046 | A1 | * | 11/2002 | Walker et al. | 382/100 |
| 2004/0093498 | A1 | * | 5/2004 | Noridomi et al. | 713/176 |
| 2005/0117775 | A1 | * | 6/2005 | Wendt | 382/100 |
| 2007/0098096 | A1 | * | 5/2007 | Akita et al. | 375/260 |

OTHER PUBLICATIONS

G. Caccia et al: "Audio watermarking based technologies for automatic identification of musical pieces in audiotracks" Multimedia and Expo, 2001, IEEE International Conference on Aug. 22-25, 2001, pp. 119-112 XP010662040.
T.A. Brown et al: "Direct-sequence spread spectrum acquisition using transform domain processing" Oct. 11, 1993, Military Communications Conference, 1993,IEEE pp. 1018-1022, XP010142785.
Search Report Dated May 2, 2007.

* cited by examiner

*Primary Examiner* — David C. Payne
*Assistant Examiner* — Syed Haider
(74) *Attorney, Agent, or Firm* — Tutunjian & Bitetto, P.C.

(57) ABSTRACT

Watermarking of audio signals intends to manipulate the audio signal in a way that the changes in the audio content cannot be recognized by the human auditory system. The watermark data are decoded from the received watermarked audio signal by correlation with corresponding candidate reference sequences. One or more of the sync symbols are embedded twice in the watermark data frame in the encoder. Thereafter a circular correlation is calculated instead of a standard correlation.

4 Claims, 1 Drawing Sheet

Figure 1:
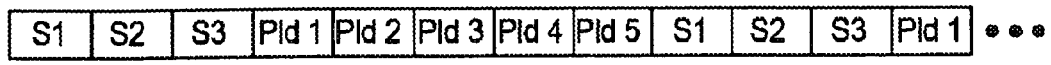

| S1 | S1 | S2 | S2 | S3 | Pld 1 | Pld 2 | Pld 3 | Pld 4 | Pld 5 | S1 | S1 | S2 | ● ● ● |

METHOD AND APPARATUS FOR CORRELATING TWO DATA SECTIONS

This application claims the benefit, under 35 U.S.C. §365 of International Application PCT/EP2007/052179, filed Mar. 8, 2007, which was published in accordance with PCT Article 21(2) on Sep. 27, 2007 in English and which claims the benefit of European patent application No. 06090037.0, filed Mar. 22, 2006.

The invention relates to a method and to an apparatus for correlating two data sections. Such correlation can be used in audio watermark decoding.

BACKGROUND

Watermarking of audio signals intends to manipulate the audio signal in a way that the changes in the audio content cannot be recognised by the human auditory system. Most audio watermarking technologies add to the original audio signal a spread spectrum signal covering the whole frequency spectrum of the audio signal, or insert into the original audio signal one or more carriers which are modulated with a spread spectrum signal. There are many possibilities of watermarking to a more or less audible degree, and in a more or less robust way. The currently most prominent technology uses a psycho-acoustically shaped spread spectrum, see for instance WO-A-97/33391 and U.S. Pat. No. 6,061,793. This technology offers a good compromise between audibility and robustness, although its robustness is suboptimal.

Many audio watermarking technologies like spread-spectrum, or phase shaping as disclosed in US-A-2005/0033579 and in EP 05090261.8, use correlation with a reference sequence for detection in the decoder. The robustness of the watermark is improved by increasing the length of the reference sequence.

INVENTION

However, the memory and processing power needed for the correlation increases more than proportional when increasing the reference sequence length. This leads to increased hardware cost of a corresponding watermark detector.

The problem to be solved by the invention is to reduce the required memory size and the required processing power. This problem is solved by the method disclosed in claim 1. An apparatus that utilises this method is disclosed in claim 5.

The general idea of the invention is to embed at encoder side the watermark symbols two (or more) times in the original audio (or video) signal, and to use in a corresponding decoder a circular correlation instead of the standard one for the watermark decoding. The watermarked audio signal is decoded by correlating the received audio signal with a corresponding (e.g. inversely transformed) candidate reference sequence.

A disadvantage is that the watermark information data rate of the watermark system is reduced slightly. However, the invention reduces the required memory size by a factor greater than two and reduces the required processing power by a factor greater than eight.

In principle, the inventive method is suited for correlating part of a received data frame containing at least one data signal section having a given length N with a reference data section having said given length N, whereby said at least one data signal section is arranged at least two times in a successive manner in said data frame, said method including the steps:

using a circular correlation, correlating said reference data section with at least a second part of a first received one of said successive data signal sections and with a corresponding first part of the repeated data signal section following said first received one data signal section;

depending on whether or not the resulting correlation value is greater than a pre-determined threshold value or smaller or equal than the negative value of said pre-determined threshold value, assigning to said correlation value either a first bit value or a second bit value different from said first bit value.

Advantageous additional embodiments of the invention are disclosed in the respective dependent claims.

DRAWINGS

Figure 3:
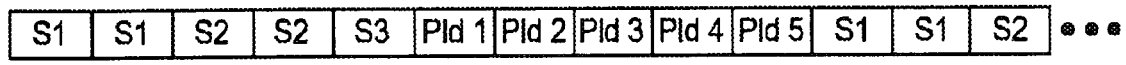
Figure 2:
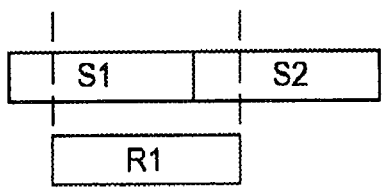
Figure 4:
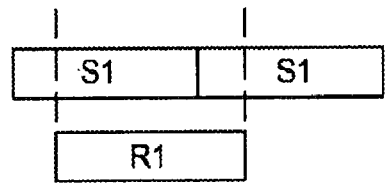
Figure 5:
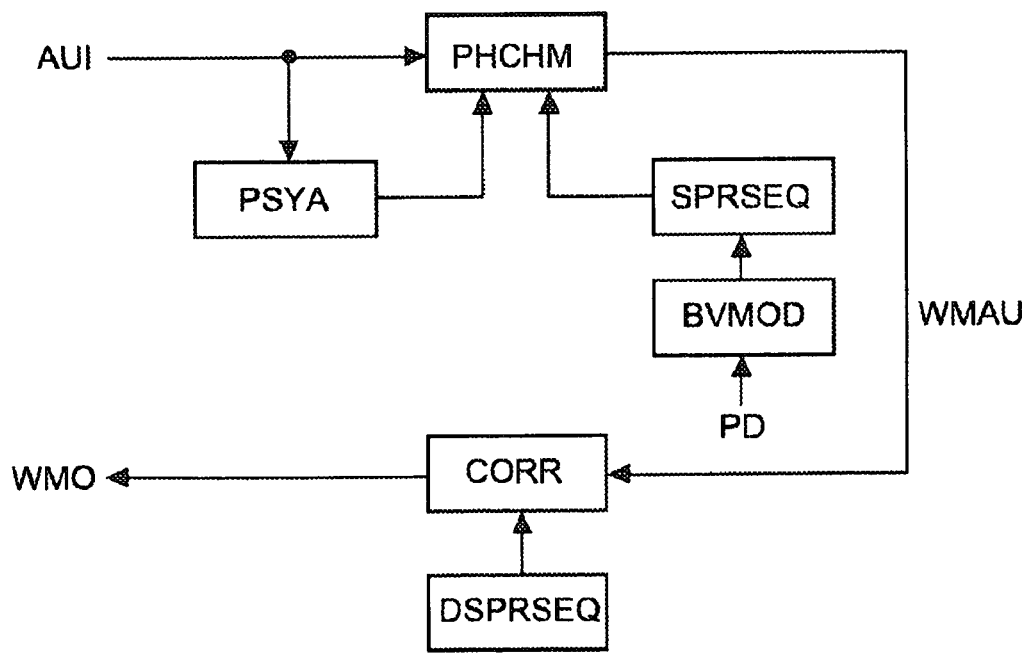

Exemplary embodiments of the invention are described with reference to the accompanying drawings, which show in:

FIG. 1 exemplary watermark data frame;

FIG. 2 an example in which the reference sequence and the corresponding sync symbol are shifted;

FIG. 3 data frame of FIG. 1 in which one or more sync sequences are embedded twice in the encoder;

FIG. 4 a part of the first sync symbol, which is not correlated, is exactly the same as the part of the second sync symbol that is correlated;

FIG. 5 example block diagram of a watermark encoder and decoder.

EXEMPLARY EMBODIMENTS

Many audio watermarking technologies like spread spectrum or phase shaping as described in EP 05090261.8 embed some kind of reference sequences in the carrier signal. If binary phase shift keying (BPSK) is used, the polarity of the sequence encodes the bit value. For code shift keying (CSK), different sequences are used for the different values of the transmitted bit value.

If the watermark message includes more than one bit, bits are combined in a data frame as shown in the exemplary data frame in FIG. 1, which frame starts with one or more synchronisation symbols S1, S2 and S3 that are followed by several payload symbols Pld1 to Pld5. These payload symbols carry the watermark data and optionally parity data for error correction. Watermark data frames are normally inserted consecutively, i.e. the following data frame starts with its sync symbols after the last payload symbol of the current data frame.

The decoding of a payload symbol is carried out using a correlation. If for example BPSK is used, a_w denotes a vector of audio samples and r the reference vector with length N. The correlation value C is calculated as follows:

$$C = \text{Sum } i=1, i<=N \, a\_w(i)*r(i),$$

i.e. the products a_w(i)*r(i) are summed up for all values for i from 1 to N. If C>0, a 'zero' value watermark bit is decoded, otherwise a 'one' value watermark bit is decoded. As an alternative, if C>TH, a first watermark bit value is decoded, and if C<TH, a second watermark bit value is decoded, whereby TH is a pre-determined threshold value.

This calculation of the correlation is only possible if a_w and r are already synchronised. If they are shifted by one or more samples, the following calculation is to be performed:

$$\text{For } k=1, k<N: C(k) = \text{Sum } i=1, i<=N \, a\_w(i-k)*r(i)$$

The offset between a_w and r can be found by looking for the location of the largest value in the correlation vector C.

FIG. 2 depicts an example in which the reference sequence R1 and the corresponding sync symbol S1 are shifted by about N/4. The input vector of the correlation is therefore R1 and the corresponding second part of S1 and the corresponding first part of S2.

The above calculation requires N*N multiplications, corresponding to the order $O(N^2)$. A fast way is known to calculate the correlation by using an FFT:

$$C = IFFT(FFT(a0\_w) * conj(FFT(r0)))$$

where a0_w is a vector of which the first N elements are equal to the elements of a_w and the following N−1 elements contain zeros. r0 is in the same way a zero padded version of r. This algorithm is of the order $O(\log(2*N)*2*N)$. Advantageously, for big values of N the FFT based approach is much faster than the direct one.

The inventive improvement consists of the following two steps.

Firstly, the one or more of the sync symbols or sequences S1 to S3 are embedded twice in the encoder as shown in FIG. 3. In this example the sync symbols S1 and S2 are embedded twice in the (watermark) data frame at encoder or transmitter side. It is not necessary to double each symbol, because the first symbols are used for the synchronisation of the watermark data frame. If the sequences (i.e. the data frames) are synchronised there is no need for performing a full correlation.

Secondly, for achieving synchronisation, at decoder or receiver side a circular correlation is calculated instead of the standard correlation. The circular correlation is calculated by:

$$C = IFFT(FFT(a\_w) * conj(FFT(r)))$$

That part of the first S1 symbol which is not correlated is exactly the same as the corresponding part of the second S1 symbol which is correlated, as can be seen from FIG. 4. This is the reason why a circular correlation can be used instead of the standard correlation. Advantageously, since no zero padding is used, the calculation is of the order $O(\log(N)*N)$, i.e. it is more than two times faster and requires only about half the memory size as when calculating the standard correlation.

If no unambiguous correlation value is detected, the correlation is to be calculated again for a position some samples later. If a standard correlation is used, the distance between two correlations should not be too long, since the correlation values diminish for longer de-synchronisations between signal and reference. For example, for a correlation of length N=4096, the distance d between two correlations should not be longer than d=1024. Advantageously, if the inventive processing is used, the correlation values do not diminish, i.e. the distance between two correlations can be the full correlation length, i.e. for a correlation of length N=4096, the distance can be d=4096.

As a result, the inventive synchronisation processing reduces the RAM needs by more than a factor of two and the MIPS needs by more than a factor of eight.

The invention can be applied for example in watermarking systems like that depicted in FIG. 5. At encoder side, an original audio input signal AUI is fed (frame wise or block wise) to a phase change module PHCHM and to a psycho-acoustic calculator PSYA in which the current psycho-acoustic properties of the audio input signal are determined and which controls in which frequency range or ranges and/or at which time instants stage PHCHM is allowed to assign watermark information to the phase of the audio signal. The phase modifications in stage PHCHM are carried out in the frequency domain and the modified audio signal is converted back to the time domain before it is output. These conversions into frequency domain and into time domain can be performed by using an FFT and an inverse FFT, respectively. The corresponding phase sections of the audio signal are manipulated in stage PHCHM according to the phase of a spread spectrum sequence (e.g. an m-sequence) stored or generated in a spreading sequence stage SPRSEQ. The watermark information, i.e. the payload data PD, is fed to a bit value modulation stage BVMOD that controls stage SPRSEQ correspondingly. In stage BVMOD a current bit value of the PD data is used to modulate the encoder pseudo-noise sequence in stage SPRSEQ. For example, if the current bit value is '1', the encoder pseudo-noise sequence is left unchanged whereas, if the current bit value corresponds to '0', the encoder pseudo-noise sequence is inverted. That sequence consists of a 'random' distribution of values, which may correspond to the structure of FIG. 3, and may have a length corresponding to that of the audio signal frames. The phase change module PHCHM outputs a corresponding watermarked audio signal WMAU. At decoder side, the watermarked audio signal WMAU passes (frame wise or block wise) through a correlator CORR in which its phase is correlated with one or more e.g. frequency-to-time domain converted versions of the candidate decoder spreading sequences or pseudo-noise sequences (one of which was used in the encoder) stored or generated in a decoder spreading sequence stage DSPRSEQ. The correlator provides a bit value of the corresponding watermark output signal WMO.

The invention is applicable in all technologies using correlation for detection and in which the embedding process can be changed such that the reference signal is embedded twice.

The invention claimed is:

1. Method in a watermark decoder for correlating part of a received data signal containing a different watermarked data signal sections representing bits of a watermark information and each having a given length N, with a reference data signal section having said given length N, whereby at an encoder some of said watermark data signal sections were arranged at least two times in a successive manner in said data signal, said method comprising the steps:
   using a circular correlation, correlating said reference data signal section with a second part of a first received one of said successive watermark data signal sections and with a corresponding first part of the received repeated watermark data signal section following said first received one watermark data signal section, wherein said second part and said first part together form a section having said given length N; and
   depending on whether or not the resulting correlation value is greater than a pre-determined threshold value or smaller or equal than the negative value of said pre-determined threshold value, assigning to said correlation value either a first bit value of a watermark information or a second bit value different than said first bit value of said watermark information.

2. Method according to claim 1, wherein said different watermarked data signal sections are arranged in watermark information data frames which include one or more synchronization symbols and one or more payload symbols, and wherein at least one of said synchronization symbols is repeated at least once in a watermark information data frame.

3. Method according to claim 1, wherein said correlating is carried out by calculating $$C = IFFT(FFT(a\_w) * conj(FFT(r))),$$

wherein C is said correlation value, r is said reference data signal section and a_w is the corresponding section of said received watermarked data signal with which said reference data signal section r is to be correlated.

4. Apparatus for correlating part of a received data signal containing a different watermarked data signal section, representing bits of a watermark information and each having a given length N, with a reference data signal section having said given length N, whereby at an encoder some of said watermark data signal sections were arranged at least two times in a successive manner in said data signal, said apparatus comprising:

means for correlating, using a circular correlation, said reference data signal section with a second part of a first received one of said successive watermark data signal sections and with a corresponding first part of the received repeated watermark data signal section following said first received one data watermark signal section, wherein said second part and said first part together form a section having said given length N; and means for assigning to said correlation value either a first bit value of a watermark information or a second bit value of said watermark information different than said first bit value, depending on whether or not the resulting correlation value is greater than a pre-determined threshold value or smaller or equal than the negative value of said pre-determined threshold value.

\* \* \* \* \*